(No Model.)

H. W. LARSSON & J. A. BROUILLARD.
DOOR SPRING AND CHECK.

No. 511,299. Patented Dec. 19, 1893.

Witnesses
John Imrie
J. S. Pfister

Inventors
Henry W. Larsson,
Joseph A. Brouillard
By Francis M. Wright,
their Attorney

UNITED STATES PATENT OFFICE.

HENRY W. LARSSON AND JOSEPH A. BROUILLARD, OF SPRINGFIELD, MASSACHUSETTS; SAID BROUILLARD ASSIGNOR TO THE UPSON NUT COMPANY, OF UNIONVILLE, CONNECTICUT.

DOOR SPRING AND CHECK.

SPECIFICATION forming part of Letters Patent No. 511,299, dated December 19, 1893.

Application filed May 2, 1893. Serial No. 472,669. (No model.)

*To all whom it may concern:*

Be it known that we, HENRY W. LARSSON and JOSEPH A. BROUILLARD, both citizens of the United States of America, residing in Springfield, in the county of Hampden and State of Massachusetts, have jointly invented new and useful Improvements in Door Springs and Checks, of which the following is a specification, reference being had to the accompanying drawings and letters of reference marked thereon.

The object of our invention is to provide a door spring and check which while being simple and inexpensive will be effective to slowly close the door and effectually prevent its being closed violently, and a device also which will operate to hold the door open when the door is opened a given distance.

We accomplish the objects of our invention by the construction herein shown.

Figure 1:
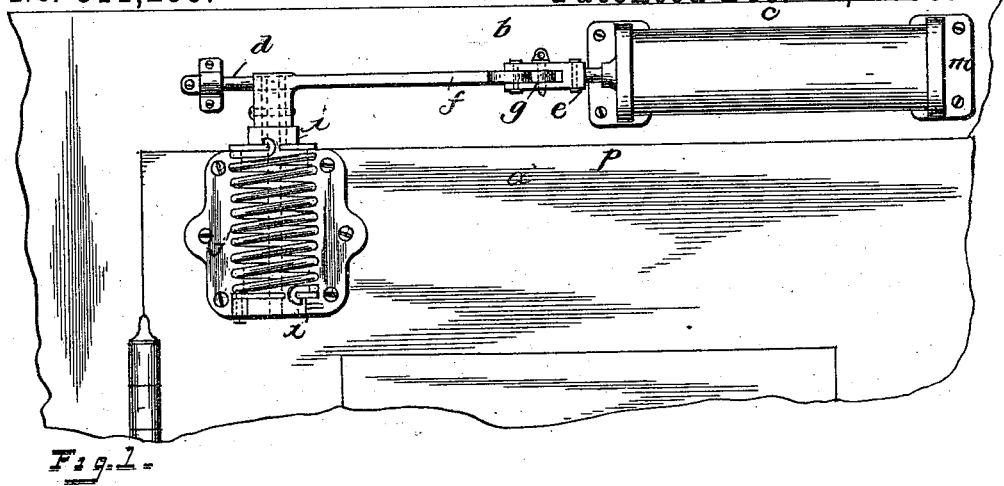
Figure 2:
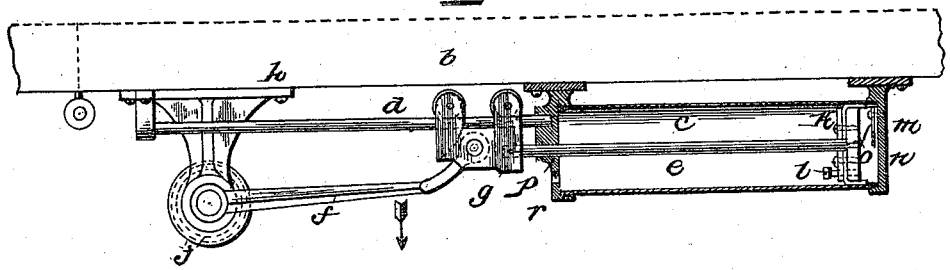
Figures 3, 4, 5, 6, 7:
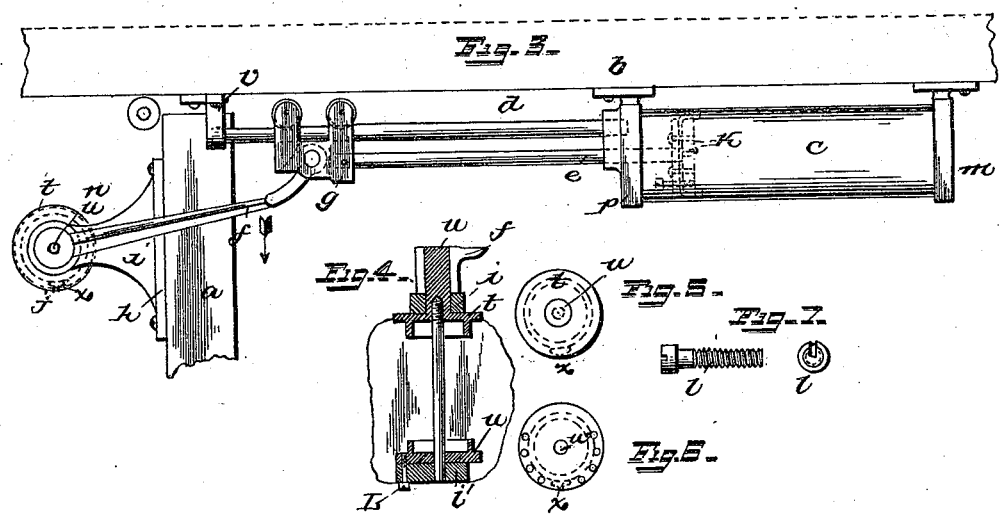

In the accompanying drawings, in which like letters of reference indicate like parts, Figure 1 is a side elevation of our device as it appears when mounted in position. Fig. 2 is a plan view with the cylinder in section. Fig. 3 is a plan view in full lines, and the ensuing figures are details.

In detail $a$ indicates a door, $b$ the door casing, $c$ a cylinder mounted on the casing, $d$ a rail or guide rod, $e$ a piston rod, $f$ a link one end of which is connected to the traveler or to the piston rod, and the opposite end connected with a spring, $g$ a traveler, $h$ a spring supporting plate secured to the door, $i$ arms upon said plate, $j$ a spring mounted between said arms, $k$ piston head, $l$ an adjusting screw mounted therein, $m$ a cylinder head and support, $n$ an air opening therein $o$ a valve mounted to close said opening, $p$ the other cylinder head and support $r$ an opening in the latter and $t$. $w$. end plates for the spring.

The construction and operation is as follows: A cylinder $c$ is suitably mounted on the casing above the door. We prefer that the cylinder heads be made integral with their supports. The head $m$ is provided with an opening $n$ and a valve $o$ is mounted on the inner face, to open automatically and allow the rapid entrance of air when the piston-head is drawn outwardly or away from this head, and to close automatically and prevent the escape of air through this cylinder-head when the piston head is forced in the opposite direction. The cylinder-head $p$ is provided with an opening for the passage of the piston rod and with an opening $r$ the office of which will be hereinafter explained.

The piston head is provided with a threaded opening into which is fitted a screw $i$ one side of which is tapered or is provided with a channel deepest at the point and very shallow or terminating near the head. The opening $r$ in the head $p$ is in register with the screw head $l$ so that when the piston head is moved close to the head $p$ the screw may be easily turned and the size of the orifice formed between the tapering channel in the screw and the threaded opening in which the screw is inserted may be varied, it being enlarged by turning the screw outwardly and contracted by turning the screw inwardly. A guide rail $d$ is mounted on the casing one end of which is preferably supported by insertion in an opening in the head $p$ and a traveler $g$ is arranged to travel on said rail, the free or outer end of the piston rod being connected to the traveler. A spring $j$ is supported between two arms $i$ which arms are mounted on a suitable base and the base secured to the door. The spring $j$ is mounted between two heads the head $t$ being constructed as shown in Figs. 4 and 5 and is provided with a stem $u$ upon which one end of the link $f$ is fixed, its opposite end being mounted on the traveler $g$. The head $w$ serves to support the opposite end of the spring and each of said heads is provided with openings $x$ to receive the spring ends, and the head $w$ is also provided with a series of threaded openings to receive a screw $z$ which passes through the support $i$ and enters the desired openings and thus prevents rotation of this head, and as one end of the spring is secured to this head the same is held in fixed position.

If now the parts are in position and it is desired to place the spring under tension to cause the closing of the door, the link $f$ is detached from the traveler, the adjusting screw $z$ removed or drawn outwardly to release the head $w$ and the spring and both heads are rotated together by carrying the free end of the link $f$ away from the carrier as indicated by the arrow, Figs. 2 and 3. The adjusting screw $z$ is then inserted thus preventing the return of the head $w$ and the arm $f$ is carried back to the first position and its end attached to the traveler.

Owing to the location of the spring bracket near the hinged edge of the door, and to the fact that the link $f$ is pivotally connected to said bracket and to the traveler, the tendency of said link to move outward with the movement of the door is overcome by its pivotal connections at the points named, and its movement with the stem $u$ of the revoluble head $t$ of the bracket, the result being that the movement of both the body of the link, (it being curved at its inner end) is rearward in a plane substantially parallel with the plane of the movement of the piston, and the upper end of the spring being connected with the link is contracted to the extent of the movement of its pivot post around which it is coiled. Therefore in moving from the position shown in Fig. 3 to that shown in Fig. 2, the spring uncoils itself through about a quarter of a circumference, thus providing force to close the door. This force lessens as the spring uncoils, but this reduction in force is counterbalanced by the fact that, by our arrangement of the link $f$ connected to the traveler $g$, which latter of course always moves in the line of the cylinder,—a fixed direction,—the direction of the force applied along the link $f$ becomes more nearly collinear with the resistance as the door closes, and the tension of the spring lessens, so that the force tending to close the door is practically uniform.

The rapidity of the movement of the door will depend upon the tension of the spring and the size of the air outlet opening.

An important advantage of our arrangement is that the weight of the cylinder, with its moving parts, and the guide rail $d$, are carried by the casing, so that very little of the weight of the mechanism is carried by the door.

The office of the valve on the cylinder head is to allow air to enter with sufficient freedom and avoid the impeding of the movement of the door when being opened, and motion of the piston head caused by the closing of the door will cause the compression of the air between the piston head and cylinder head except as to the air allowed to escape through the air vent the size of which is governed by the position of the screw $l$. If the door be carried to the open position such distance as to carry the arm $f$ past the center line of the piston rod the door will remain at rest.

To avoid friction we provide the traveler with anti-friction rolls.

Having, therefore, described our invention, what we claim, and desire to secure by Letters Patent, is—

The combination, with a stationary cylinder adapted to be secured on the casing above a door, a piston head and piston rod moving in said cylinder when so supported, a stationary guide rail secured at one end to the cylinder and adapted to be secured at the other end to the casing, a traveler carried by the end of the piston rod, traveling on the guide rail, a bracket extending outwardly from the top of the door, a link jointed to the bracket and to the traveler, and a coiled spring on the bracket actuating said link, substantially as described.

HENRY W. LARSSON.
JOSEPH A. BROUILLARD.

Witnesses:
ALLEN WEBSTER,
WILLIE E. PETERS.